US006769532B1

(12) United States Patent
Jonkka

(10) Patent No.: US 6,769,532 B1
(45) Date of Patent: Aug. 3, 2004

(54) METHOD AND APPARATUS FOR CONVEYING A SOLID MATERIAL

(75) Inventor: Arvo Jonkka, Pori (FI)

(73) Assignee: Metso Woodhandling Oy, Pori (FI)

( * ) Notice: Subject to any disclaimer, the term of this patent is extended or adjusted under 35 U.S.C. 154(b) by 0 days.

(21) Appl. No.: 09/869,758

(22) PCT Filed: Jan. 3, 2000

(86) PCT No.: PCT/FI00/00001

§ 371 (c)(1), (2), (4) Date: Sep. 4, 2001

(87) PCT Pub. No.: WO00/40383

PCT Pub. Date: Jul. 13, 2000

(30) Foreign Application Priority Data

Jan. 7, 1999 (FI) .................................. 990014

(51) Int. Cl.$^7$ ............................................. B65G 25/04
(52) U.S. Cl. ................................. 198/750.2; 414/525.9
(58) Field of Search .................... 198/750.2; 414/525.9; 144/208.4, 208.5, 187, 188, 191, 252.1, 252.2

(56) References Cited

U.S. PATENT DOCUMENTS

| | | | | |
|---|---|---|---|---|
| 2,673,638 A | * | 3/1954 | Barrett et al. .................. 198/56 |
| 2,739,722 A | * | 3/1956 | Joy .............................. 214/518 |
| 4,549,840 A | * | 10/1985 | Ansbjer ....................... 414/24.5 |
| 5,063,981 A | * | 11/1991 | Jonkka ......................... 144/341 |
| 5,238,360 A | * | 8/1993 | Foster ......................... 414/525.9 |
| 5,241,999 A | | 9/1993 | Fulghum, Jr. et al. |
| 5,370,217 A | * | 12/1994 | Foster ......................... 198/750 |
| 5,383,548 A | * | 1/1995 | Quaeck ........................ 198/750 |
| 5,505,292 A | * | 4/1996 | Foster ...................... 198/750.2 |
| 5,547,067 A | * | 8/1996 | Foster ...................... 198/750.3 |
| 5,860,508 A | * | 1/1999 | Foster ...................... 198/750.5 |

FOREIGN PATENT DOCUMENTS

SE     462 024 A 1     3/1988

* cited by examiner

Primary Examiner—Christopher P. Ellis
Assistant Examiner—Rashmi Sharma
(74) Attorney, Agent, or Firm—Burns, Doane, Swecker & Mathis, L.L.P.

(57) ABSTRACT

In a method and conveyor for conveying a solid material by means of parallel, oblong transfer elements that move back and forth in the direction of transfer, most of the surface of the transfer elements moves in the direction of transfer at the same time and at least part of the surface thereof is inclined towards the center of the conveyor. Pieces of material lying on inclined outermost transfer elements are carried on a lower longitudinal part of the transfer elements, the angle of inclination of the part about the longitudinal axis being smaller than the angle of inclination of the upper part thereof. Thus, the support force exerted by the transfer elements on the pieces lying thereon, and the friction force between them and the pieces lying thereon, increase. At the same time, the support force that is exerted by second transfer elements situated lower with respect to the outermost transfer elements on the pieces lying thereon, and the friction between the second transfer elements and the pieces lying thereon, decrease.

10 Claims, 10 Drawing Sheets

METHOD AND APPARATUS FOR CONVEYING A SOLID MATERIAL

This invention relates to a method of conveying a solid material in pieces or parts, such as logs, chips or bark, with a conveyor using parallel, oblong transfer elements that move back and forth in the direction of transfer, most of the surface of the transfer elements, which are in contact with the material to be conveyed during the motion of transfer, moving in the direction of transfer at the same time and at least part of the surface of the transfer elements being inclined about its longitudinal axis, towards the centre of the conveyor. The invention relates also to a conveyor that is intended for conveying a solid material in pieces or parts, such as logs, chips or bark, and that is composed of parallel, oblong transfer elements that move back and forth in the direction of transfer, most of the surface of the transfer elements, which are in contact with the material to be conveyed, being movable in the direction of transfer at the same time and at least part of the surface of the transfer elements being inclined about its longitudinal axis, towards the centre of the conveyor.

In recent years, an apparatus according to patents FI 83181 and U.S. Pat. No. 5,063,981 has been developed for the transport of pulp wood, for example, which has proved to be very useful for feeding pulp wood into a barking drum. In the apparatus, the friction force between the pieces to be conveyed is increased by inclining the transfer elements with the result that the pieces do not tend to move backward during the return motion of the transfer elements. The apparatus according to said invention requires, however, a relatively large number of transfer elements. In practice, 6 to 8 transfer elements are needed whose movement has to be accurately controlled to make the apparatus operate in the correct way. Today, the pulp wood feeding devices according to the known invention are usually provided with beam-like, roller-supported transfer elements. This results in a relatively expensive structure comprising a great number of parts.

The conveyor according to the invention is characterised in that the pieces or parts lying on the inclined, outermost transfer elements are carried by means of the lower longitudinal edge of the outermost transfer elements, the angle of inclination of said edge about the longitudinal axis being smaller than the angle of inclination of the upper edge of the outermost transfer elements;

whereby the support force exerted by the outermost transfer elements on the pieces or parts lying thereon, and the friction force between the outermost transfer elements and the pieces or parts lying thereon, increase; and whereby the support force exerted by second transfer elements situated lower with respect to the outermost transfer elements, on the pieces or parts lying thereon, and the friction between said second transfer elements and the pieces or parts lying thereon, decrease.

The conveyor according to the invention is characterised in that at least in some of the transfer elements, the angle of inclination of the lower part of the transfer elements about the longitudinal axis is smaller than the angle of inclination of the upper pan thereof.

According to the invention, the load exerted on the lateral transfer elements of the conveyor, which usually are inclined at an angle of at least 45° towards the centre, is increased by transferring an extra load that results from a change of direction of the packing forces is caused by the loads of said elements to them. The surface of the outermost transfer elements of the conveyor can be bent in such a way that the inclination of the lower edge of the transfer elements is equal to or somewhat greater than the angle at which the following transfer element is inclined towards centre of the conveyor.

The invention and the details thereof will be described in more detail in the following with reference to the accompanying drawings wherein FIG. 1 is sectional view of a previously known conveyor.

(FIGS. 2 to 6 are drawings that illustrate the principles.)

Figure 1:
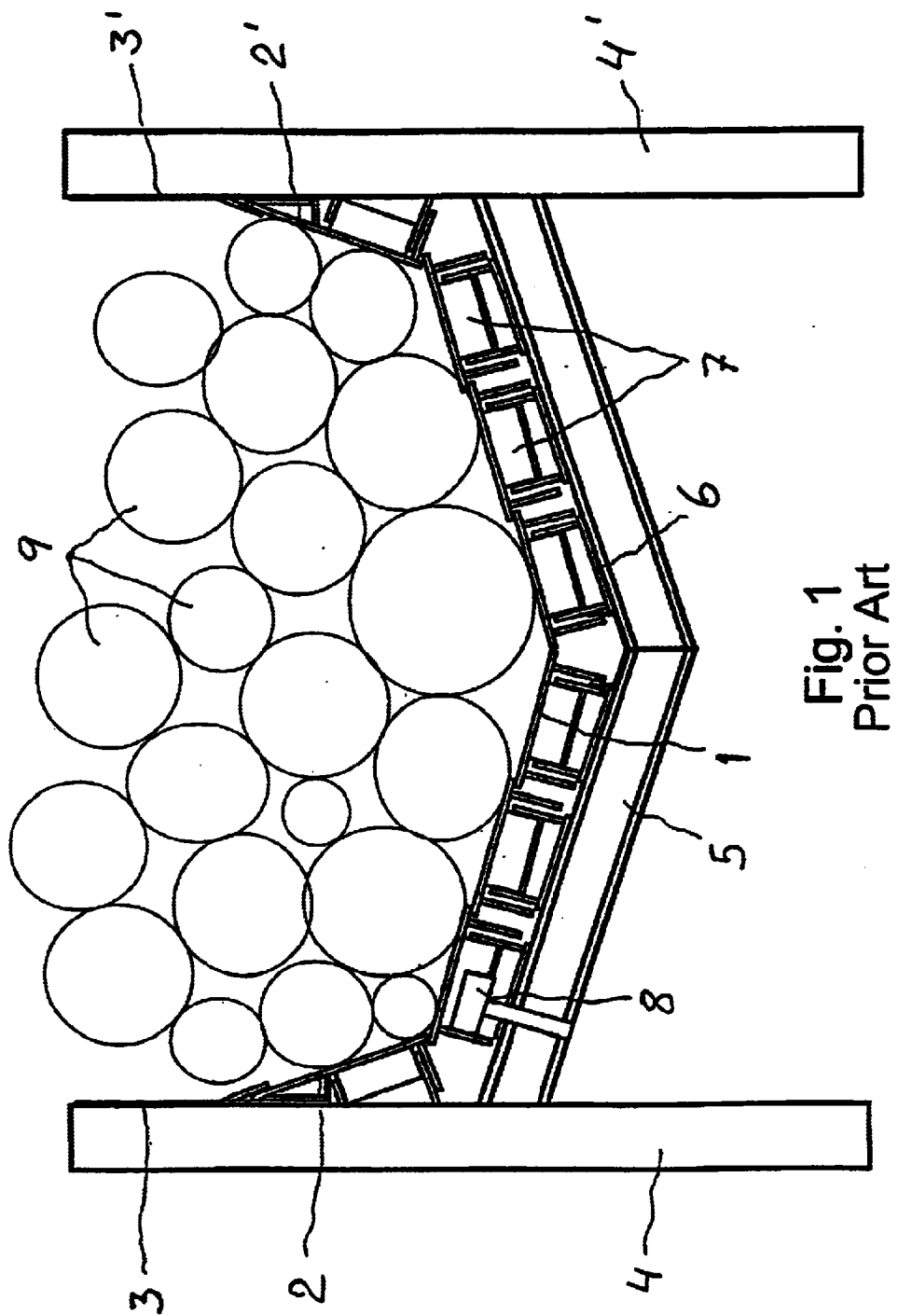

FIG. 1 shows the conveyors according to patents FI 83181 and U.S. Pat. No. 5,063,981 that are now in use and that effectively convey bundles of logs to be pulped due to the groove-like shape of the conveyor bottom composed of eight transfer elements. The conveyors according to FIG. 1 being ascending in the direction of transfer, and the friction between the material to be conveyed and the sides being disadvantageous, the outermost transfer elements are inclined at a steep angle of approximately 60° with respect to the longitudinal axis and give therefore a larger movable lateral surface, decreasing the friction against the sides.

The conveyor bottom is composed of 6 similar beam-like transfer elements 1 having the same inclination with respect to the longitudinal axis. Transfer elements 2 and 2' are fixed to the sides 3 and 3' of the apparatus. The sides of the apparatus are carried and supported by legs 4 and 4' that also carry transversal, slightly V-shaped beams 5. Roller supports 6 and rollers 7 rotating about transversal axes are mounted on these.

The distance between the beams 5 from each other is 1 to 2 meters at the loading point of the apparatus and 2 to 3 meters in the area of transfer. In practice, by reason of lower constructional costs, the six beams forming the bottom of the chute are mounted in such a way that there are three conveyor beams having the exactly same angle of inclination on each side. This commonly used construction has resulted in an uneven distribution of load to the conveyor beams, especially when using large logs that cause only a few load application points at the bottom and impose therefore restrictions on angle, of ascent of the conveyor. Besides, an uneven load distribution results in that an apparatus according to FIG. 1 has to have a plurality of transfer elements and consequently a great number of supports and rollers. The load exerted on the logs 9 causes a load peak in the centre of the conveyor and by the outermost transfer elements 2 and 2' as the packing force holding the bundles of logs together causes, in the corners, an extra support force due to a change of the direction of inclination. (See FIG. 6.)

An apparatus according to FIG. 1 does not require only support rollers but also lateral guide rollers 8 placed at given intervals to keep the conveying beams at the right position in the lateral direction. Furthermore, each beam has to have an own driving device that in practice is a hydraulic cylinder. As is described in said patent specifications, the movements of the transfer elements have to performed according to a given program. This results in that the more transfer elements the apparatus has, the more complicated is the control of the operation of the apparatus.

Figure 2:
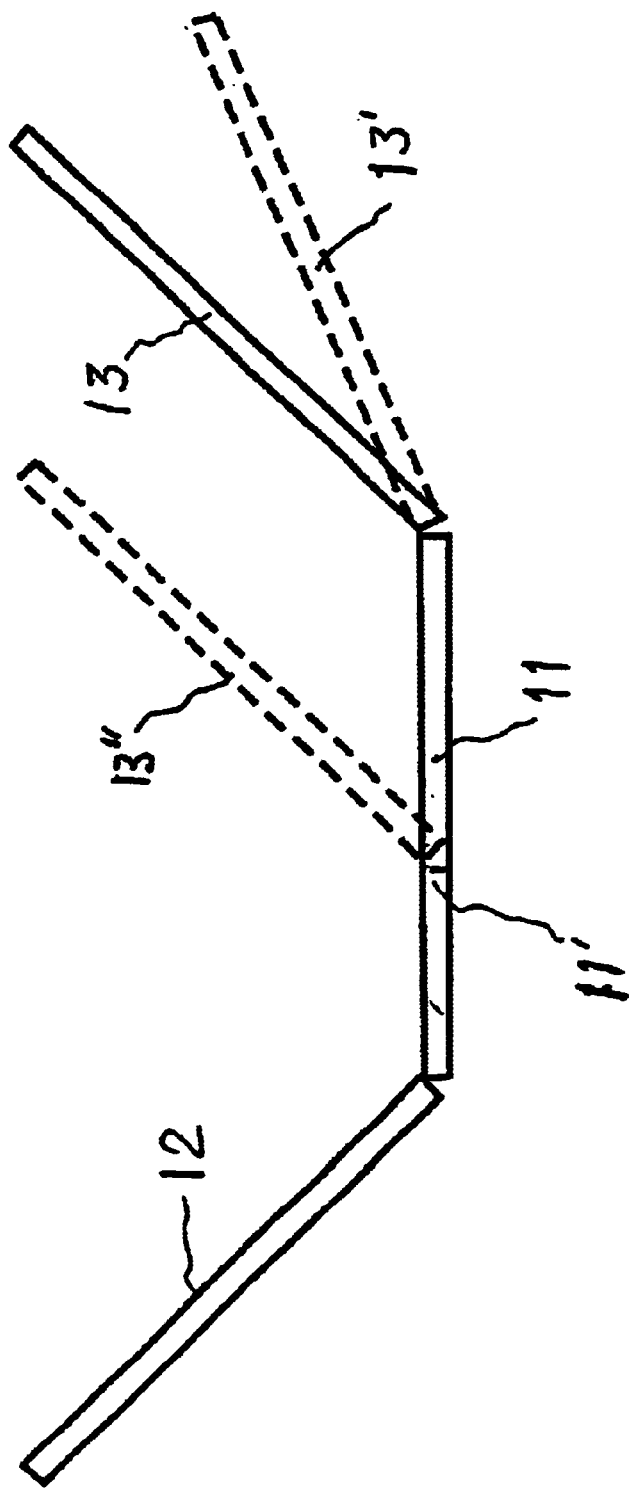
FIG. 2 shows a conveyor provided with three transfer elements.
Figure 3:
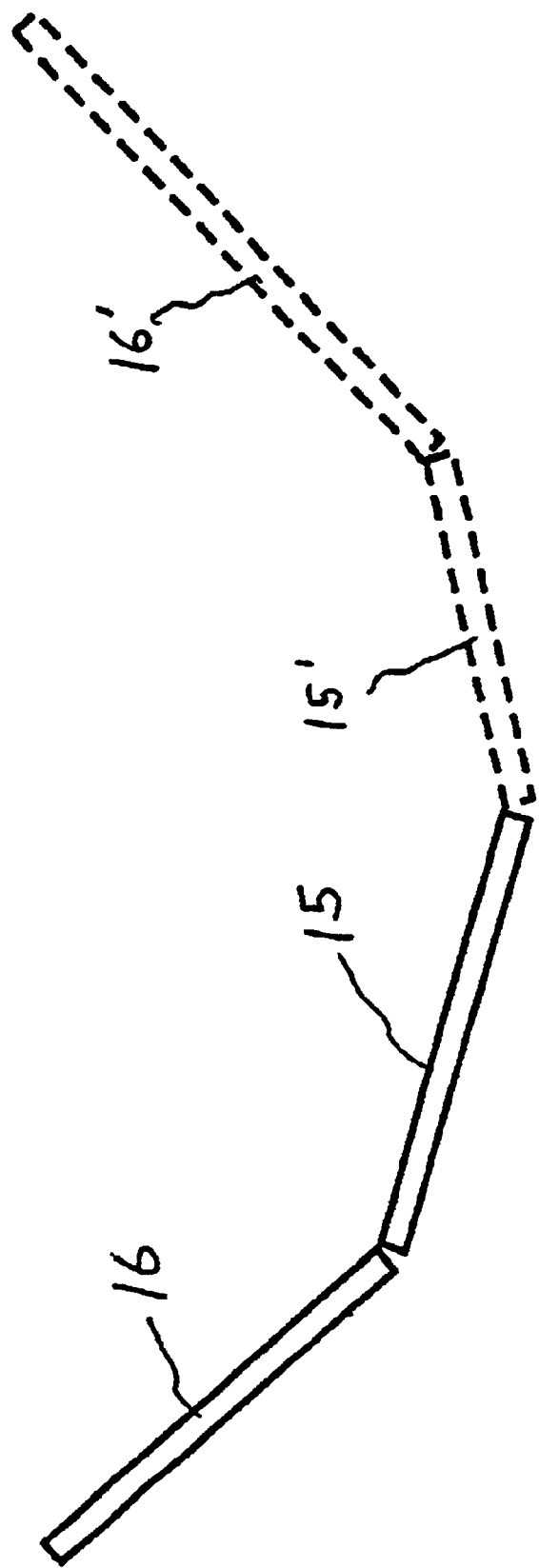
FIG. 3 shows a conveyor provided with four beams.

The aim has been to reduce the number of the conveying beams considering the advantages of this type of apparatus. FIGS. 2 and 3 show a conveyor having three and four transfer elements, respectively. The transfer elements that have been drawn using a solid line form the desired conveyor model and the broken lines show the bottom shape that, according to scale model tests, gives the best possible transport capacity.

In an apparatus according to FIG. 1 the motion of transfer is continuous, i.e. a larger part of the surface of the transfer elements moves forward than backward at the same time and the speed of the return motion exceeds the speed of the feed motion. Attempts have been made to replace this conveyor giving a continuous motion of transfer with a simpler apparatus comprising three or four periodically operating transfer elements. In this type of apparatus, all the transfer elements move forward at the same time and perform the returning movement one by one, thus making it possible to utilise the friction against the sides and to improve the transport capacity. In a conveyor according to FIG. 1 giving a continuous motion of transfer, the braking friction caused by the fixed, immobile sides is merely disadvantageous. The outermost transfer elements of an apparatus according to FIG. 1 must therefore have a great angle of inclination so that they cover most of the surface of the sides. In a periodically operating apparatus that utilises the friction against the sides, the transfer elements are preferably inclined at an angle of approximately 45°, which causes an adequate packing force towards the centre of the conveyor.

The scale model tests carried out on a conveyor according to FIG. 2 show that the central transfer element 11 tends to carry too great a load and draws the pieces to be conveyed backwards during the return motion. The tests also show that the part 11 does not have to take such a great load if the outermost transfer elements are inclined into a position 13' with a smaller angle of inclination. A smaller angle, however, also results in that the pieces to be conveyed and lying on the part 13' follow it and move backward during the return motion thereof. On the other hand, by disposing one of the inclined transfer elements at the position 13", closer to the opposite side, an even load distribution can be achieved in tests, but the situation is unstable, especially when the size of the pieces varies. Besides, the transport capacity of the apparatus decreases and the outermost parts 12 and 13 have to be made much wider if the central transfer element is given the size 11' by making it narrower and if the size of the apparatus is reduced.

The left side of a conveyor according to FIG. 3 is composed of transfer elements 15 and 16. Practical tests show that the central transfer element 15 tends to draw the entire load backward, especially when the conveyor is mounted at a slight angle of ascent. According to tests, the right relationship of the widths of the transfer elements to each other is the one shown in the right half of FIG. 3 where the width of the transfer element 15' is approximately 70% of the width of the transfer element 16'.

As is apparent from the above, the conveyors shown in FIGS. 2 and 3 have a disadvantageous sectional profile comprising narrow transfer elements in the middle, and especially the risk of the material to be conveyed arching increases. Furthermore, the apparatus is not at all similar in shape to a round, groove-like bottom, one result of which is that the feeding of the barking drum is less efficient.

Figure 4:
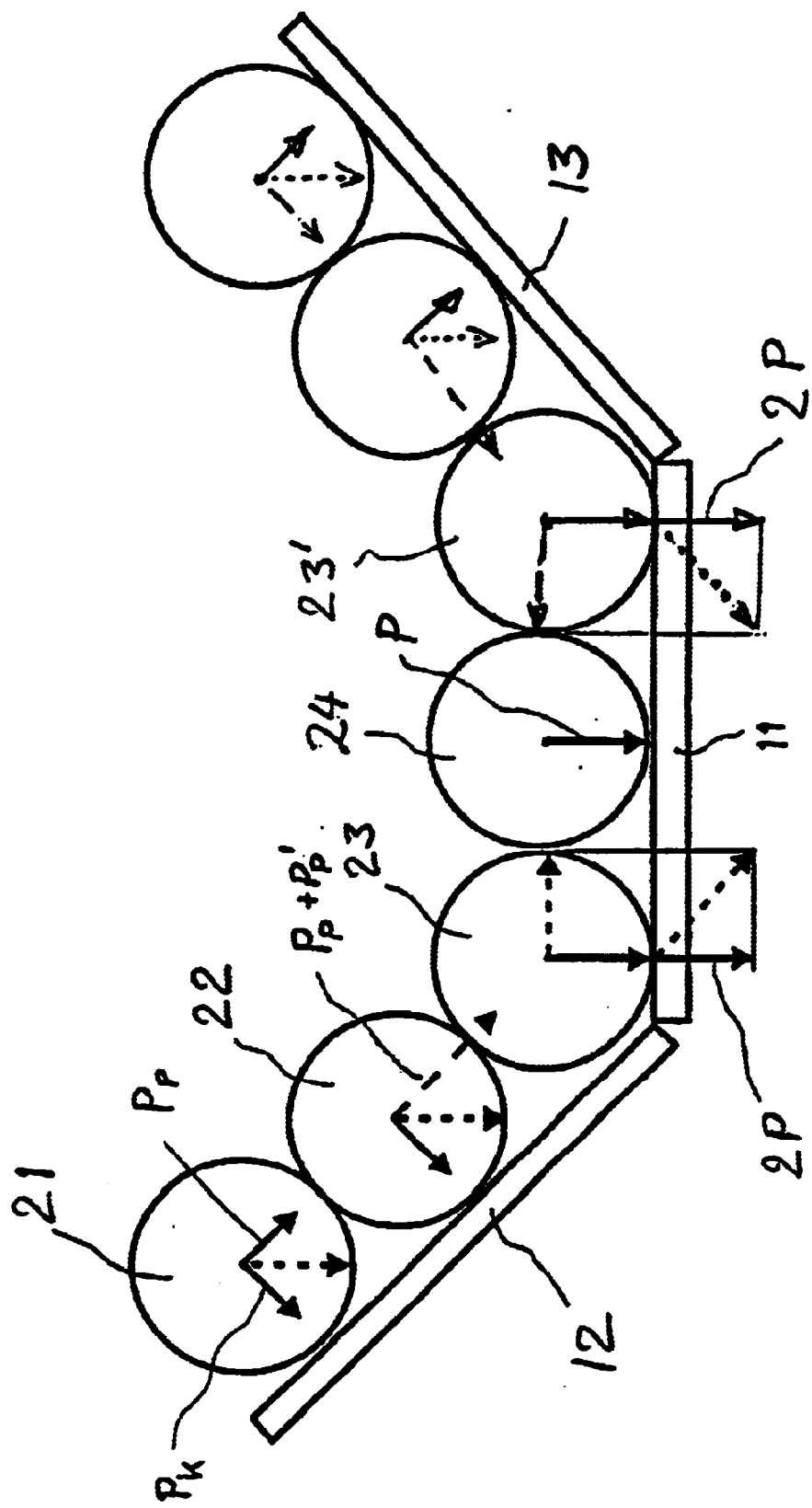
FIG. 4 shows a load situation in the operation of a previously known conveyor.

FIG. 4 shows schematically the loads and friction forces acting in a conveyor according to FIG. 2 in the transport of pulp wood. The case has been simplified by assuming that the logs are similar in weight and in diameter. The friction acting in the crosswise direction of the conveyor is not considered as its effect on the packing forces disappears during the return motion of the transfer elements.

The outermost transfer elements 12 and 13 are inclined at an angle of 45° and give the log 21, which has the weight P, the friction force components $P_k$ against the transfer element and the packing force $P_p$ toward the adjacent log. The log 22 has the same forces but the packing force against the log 23 is $P_p+P'_p-2P_p$. Thus, the weight P of the log 23 lying on the transfer element 11, when the angle of influence is 45°, has an extra force $2P_p=P$, i.e. the friction force against the part 11 is constituted by the support force 2P.

The log 23' has also the same support force, and the log 24, when the logs 23, 24 and 23' are of the same size, causes the support force P. To sum up, a friction force is generated for the outermost transfer elements 12 and 13 from the loads $2\times2 \sqrt{0,5}P$, i.e. from a load of approximately 2,8P in all. A friction force is generated for the central transfer element from the total load 5P.

It is thus easy to calculate that, even if a length corresponding to the diameter of the log 24 was taken off the width of the apparatus and of the transfer element 11, the load exerted on the part 11 would still be greater than the total support force of the parts 12 and 13 and the transfer element lying in the middle would draw the entire load backward during the return motion. On the basis of a theoretical study it can be stated that, when the inclination of the transfer elements is 45° or greater, malfunction of the apparatus is encountered. On the other hand, it was already stated earlier that the angle of the outermost transfer elements has to be at least 45°.

From the above description of an apparatus according to FIG. 4 appears why a conveyor with three transfer elements according to FIG. 4 is not serviceable.

The apparatus works well only if all the transfer elements have the same support force $\Sigma P$, i.e. $\Sigma P_{12}=\Sigma P_{11}=\Sigma P_{13}$. The operational limit of the apparatus is reached, however, when $\Sigma P_{12}+\Sigma P_{13}$ is greater than $\Sigma P_{11}$.

Figure 5:
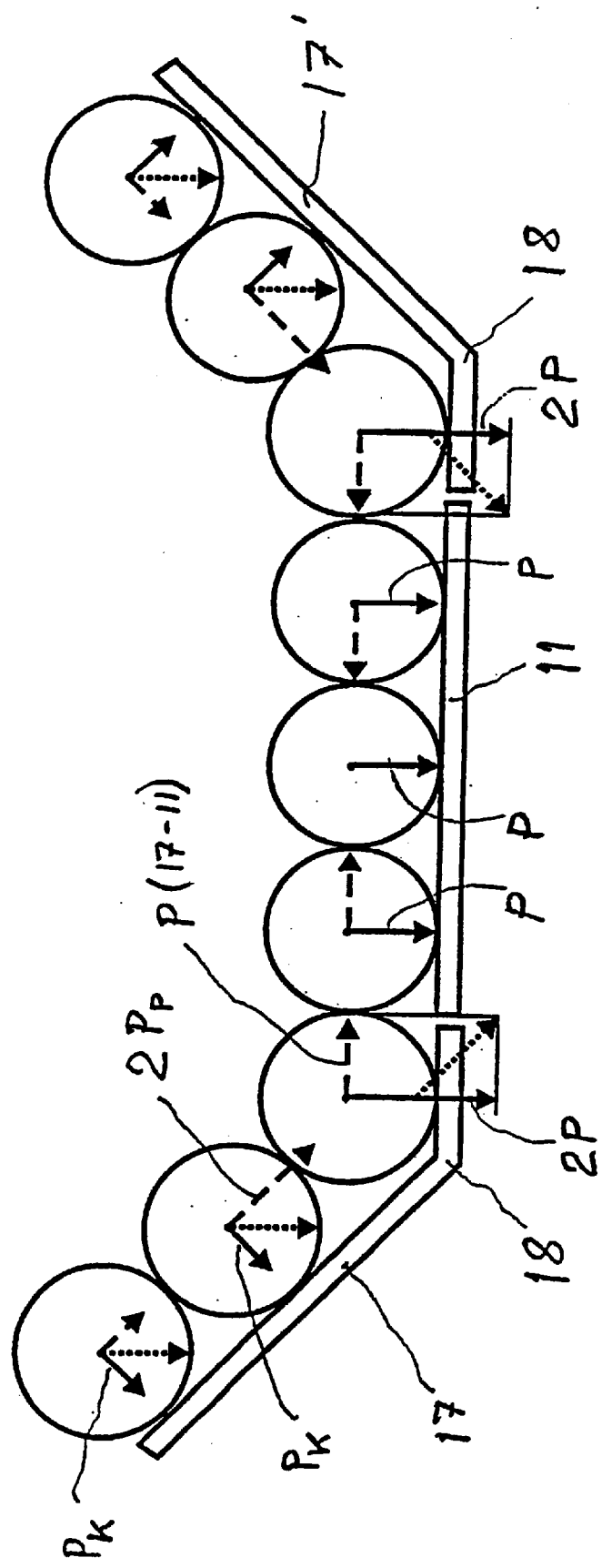
FIG. 5 is a sectional view of a conveyor according to the invention to which a new load distribution method is applied.

FIG. 5 shows how thoroughly the method according to the invention changes the load conditions in a conveyor. The outermost transfer elements are provided with a load "optimising bend" 18, as a result of which the lower part thereof runs in the same direction as the part 11. As FIG. 5 shows, a support force of 3P is exerted on the central transfer element 11. When using a load according to FIG. 4, a support force≈3,4 P is generated for each of the outermost transfer elements 17 and 17'. FIG. 5 shows very clearly how the bent lower part completely changes the load situation of the entire apparatus. The problem with the apparatus shown in FIG. 5 is that the packing force $P_p$ (17–11) between the transfer elements intended for the material to be conveyed is inadequate. Therefore, it can be stated that the method is not carried out in the best possible way in FIG. 5.

Figure 6:
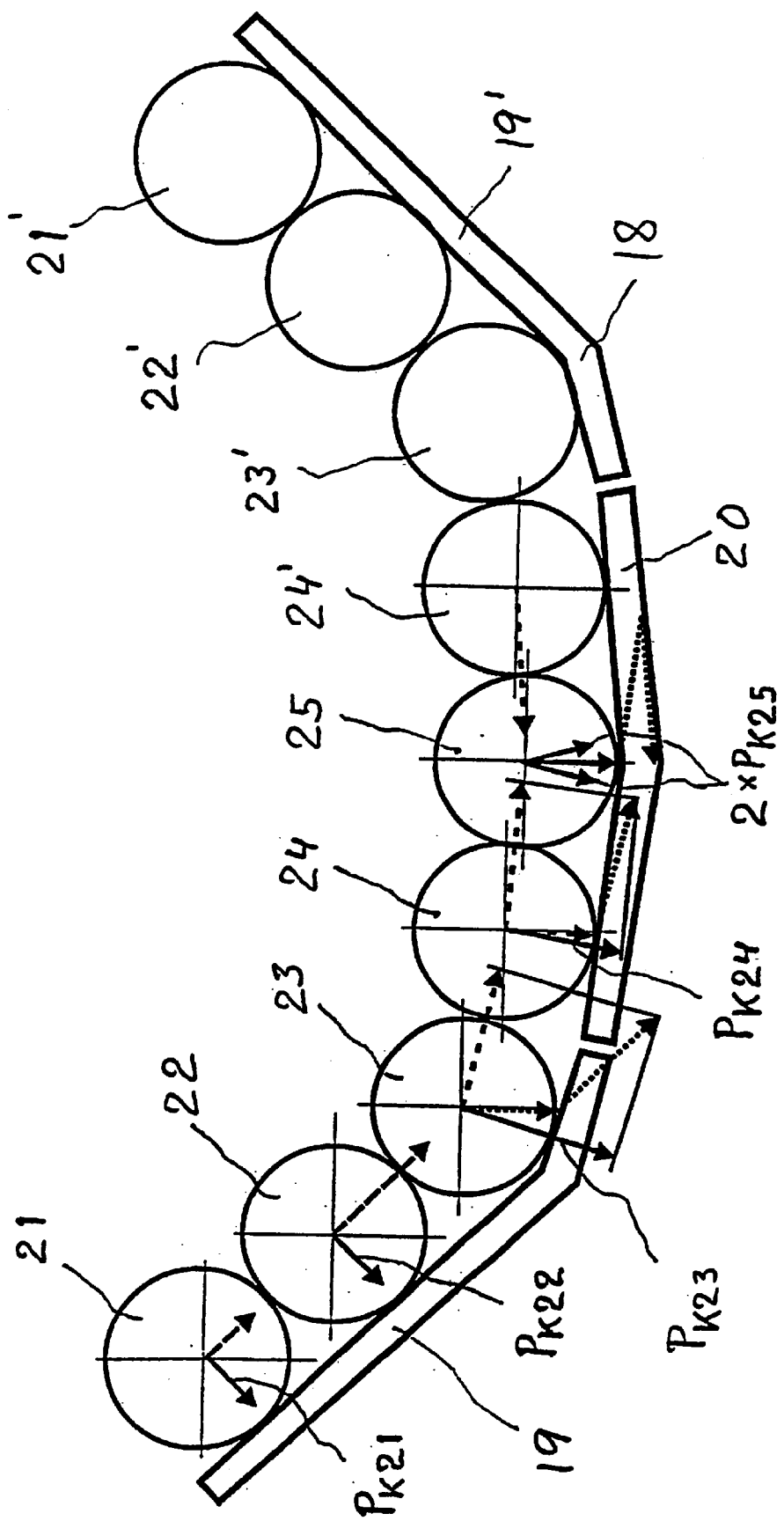
FIG. 6 shows how the load is optimised by means of the invention.

FIG. 6 shows how an almost optimal load distribution is achieved using the method according to the invention. The central transfer element 20 is made slightly V-shaped by bending it so that the inclination towards the centre of the conveyor is approximately 9°. The support forces $P_{K24}+2P_{K25}+P_{K24}$, of the central transfer element and the support forces $P_{K21}+P_{K22}+P_{K23}$ of each outermost transfer element 19 and 19' are approximately 3,4P and 3,1P in all, respectively. The angle of inclination of the upper part of the outermost transfer elements is 45°, and the optimising bend 18 reduces the inclination of the lower part of the transfer element to 15°. This conveyor is a conveyor wherein the transfer elements have a virtually perfect load distribution. A completely even load distribution is achieved if the angle of the optimising bend is made somewhat greater so that the lower part of the parts 19 and 19' are inclined at angle of approximately 10° towards the centre.

Figure 7:
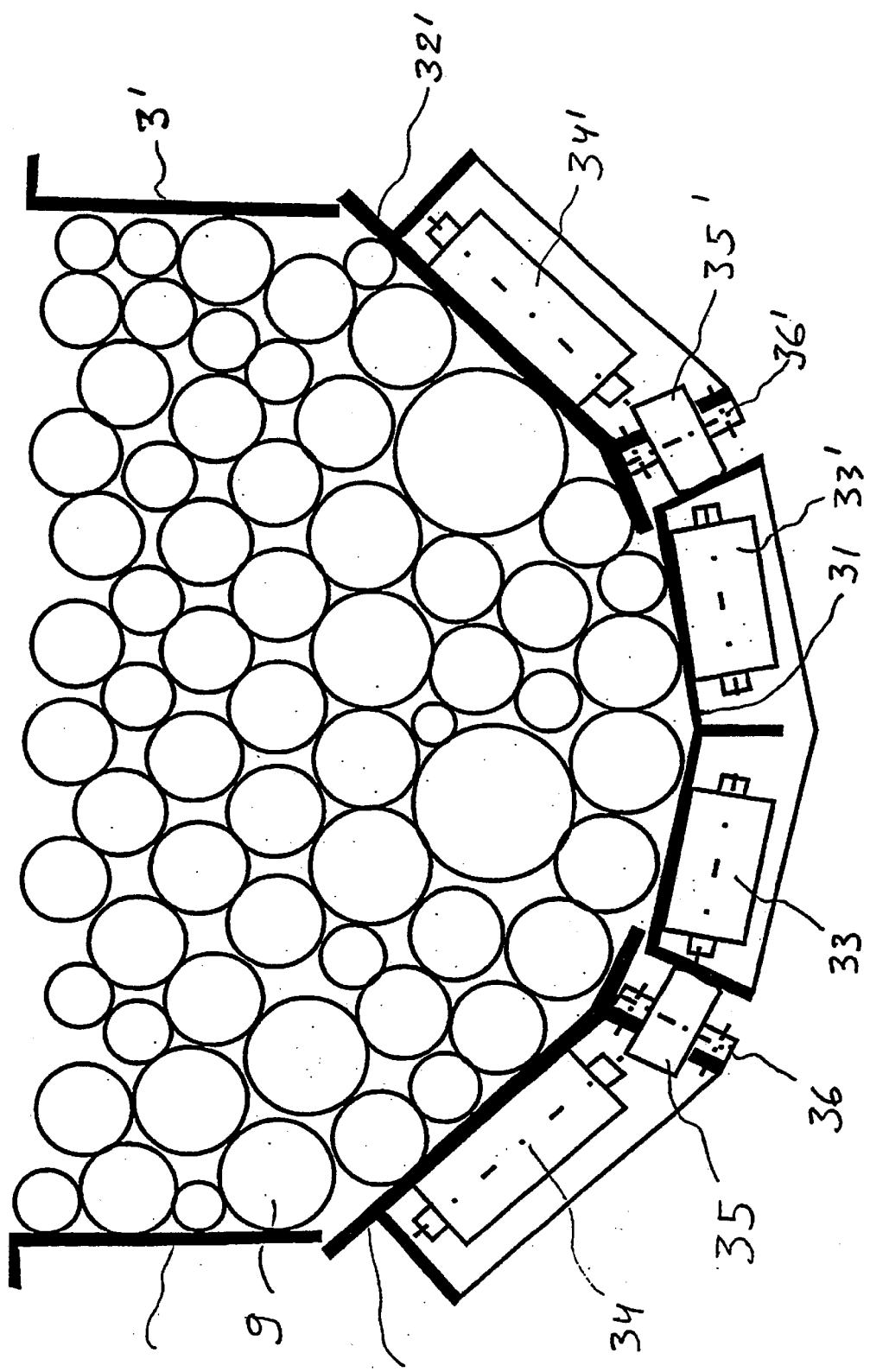
FIG. 7 shows the use of the invention in connection with a conveyor having three beams.

FIG. 7 shows a periodically operating apparatus according to the invention that has three beam-like transfer elements and that is a non-littering conveyor as the conveyor beam 31 lying in the middle forms a collecting and conveying chute and the outermost conveying beams 32 and 32' drop the fine loose material into this. The scrap-collecting device is preferably made from an uneven number of beams, i.e. from 3, 5 or 7 beams.

The support rollers 33 and 33' centre the conveyor beam 31 and it does not need to be guided laterally. Rollers 34 and 34' support the outermost beams. The lateral support thereof is constituted by the guide roller 35 supported against the beam 32 by means of a shaft 36. Considering the large mass of the beams 31, 32 and 32', a sufficient centring force is achieved that holds the beams in position due to the slightly V-shaped middle beam.

A conveyor according to FIG. 7 operates periodically, and the height of the fixed sides 3 and 3' is selected in such a way that their total friction force is equal to the single friction force of one beam. For the sides must often be selected a greater height for reasons of security, in which case a suitable loading level is selected considering the fact that the apparatus should function in the best possible way.

Figure 8:
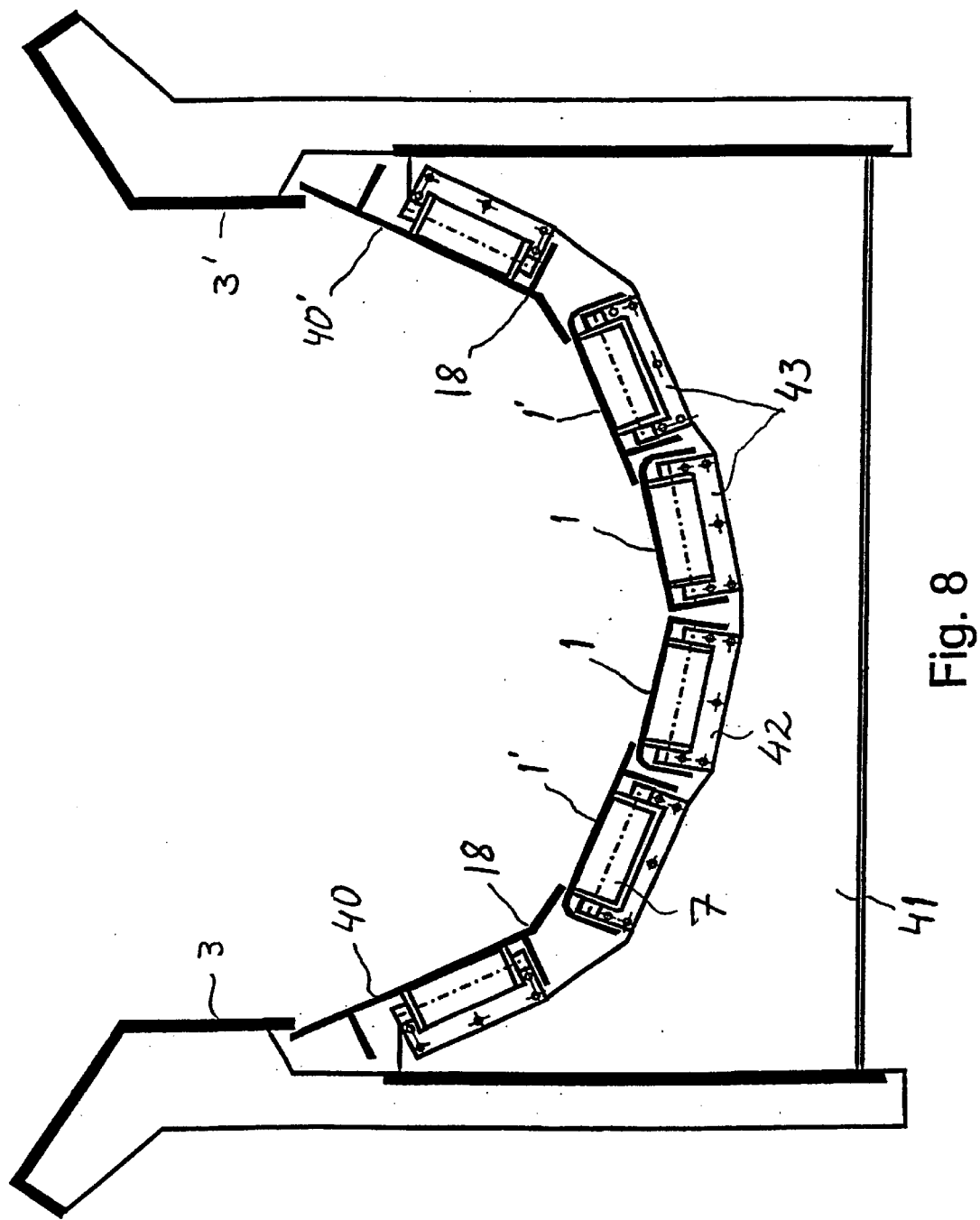
FIG. 8 shows the use of the invention in connection with a conveyor having four beams.

FIG. 8 shows a continuously operating conveyor having 4 conveyor beams 1 according to invention disposed in the middle, at the bottom, and lying on conveyor rollers 7 according to FIG. 1. In contrast with FIG. 1, the beams 1 and 1' are inclined at different angles towards the centre of the conveyor, the outer beams being more inclined than the ones lying in the middle. As it is desired to mount the conveyor shown in FIG. 8 at an angle that ascends steeply in the direction of transfer, the outermost transfer elements 40 and 40' are placed in such a way that they form a deep conveying chute, and only a little friction is generated against the fixed sides 3, 3'. A sufficient load is achieved for the outermost beams 40 and 40' by means of the "optimising bends" 18. The support frame 41 carrying the support rollers 7 is made from a thick sheet of steel by flame cutting. The rollers 7 are supported on the support frame 41 by means of plates 42. Thus, no extra costs are involved in the manufacture when it is desired to mount the conveyor beams at an angle that gives an optimal load. It becomes difficult to make a support beam 5 according to FIG. 1 if the support rollers 7 have to he mounted at different angles.

The conveyor load optimising system according to the invention and FIG. 8 makes it possible to build a conveyor for materials cut into pieces that is considerably simpler than the conveyors according to patents FI 83181 and U.S. Pat. No. 5,063,981. The load optimising also enables steep angles of ascent to be used, as a result of which the conveyor can be made much shorter.

Figure 9:
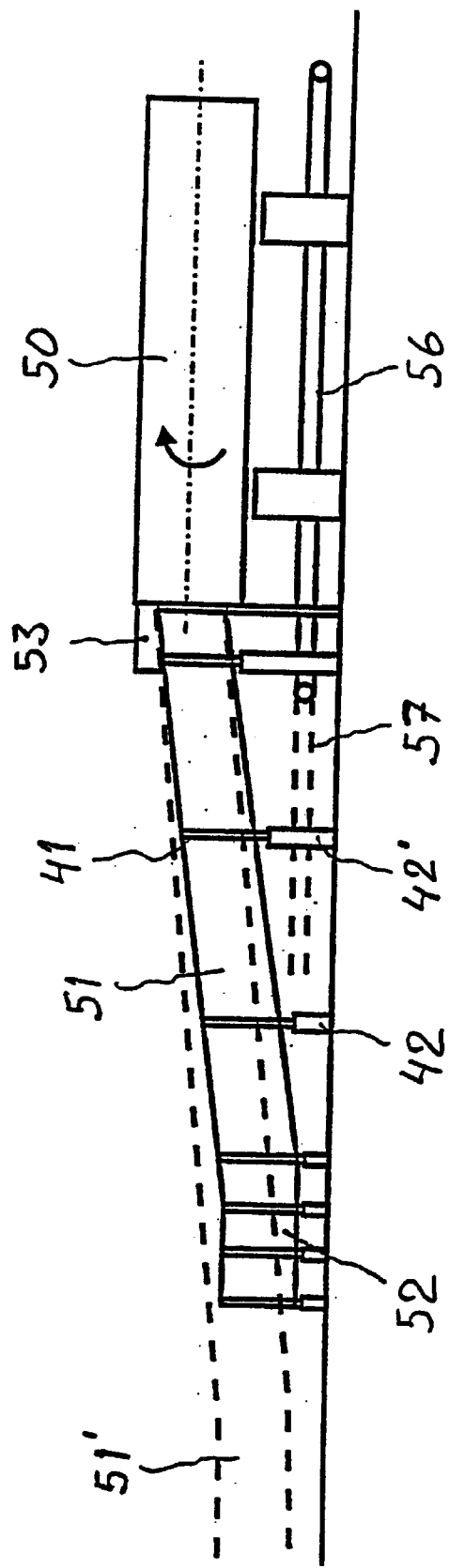
FIG. 9 is side view of a conveyor according to the invention in connection with barking drum feeding.

FIG. 9 shows a rotating barking drum 50 that is fed by a conveying or feeding device 51 according to the invention. The broken line defines a conveyor 51' wherein the transfer elements do not have an even load distribution. In conveyors having side beams provided with "optimising bends" and a small number of beams due to efficient operation, the conveyor beams can be made so stiff that the bearing support legs 42 and 42' and the support frames 41 are spaced apart. In this case, the support legs 42 can be mounted at 4 to 6 m intervals between the loading part 52 and the feed tunnel 53 of the barking drum.

Figure 10:
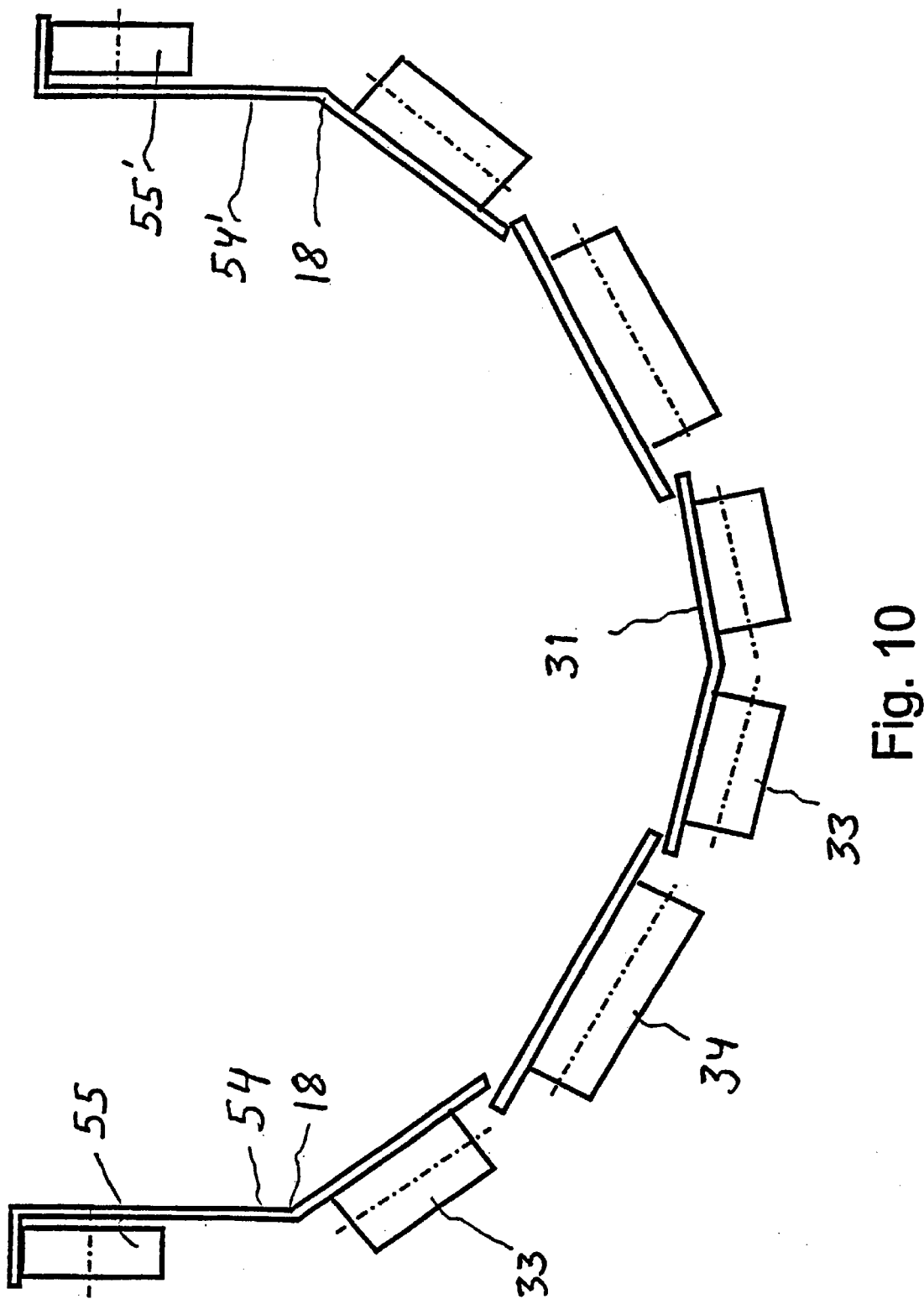
FIG. 10 shows a sectional alternative for an apparatus according to FIG. 9.

Furthermore, the feeding device shown in FIG. 9 can be built using the sectional solution according to FIG. 10, in which case the outermost beams 54 and 54' also serve as transfer elements and there is no immobile conveyor part between the support legs 42. The outermost transfer elements do not only have a support system according to FIG. 7 but also support wheels 55 and rollers 33. The rollers are supported on a steel panel frame according to FIG. 8 that is mounted on a support leg 42. As far as the apparatus shown in FIG. 10 is concerned, the decision on the position of the "optimising bend" in the transfer elements 54 is made on the basis of the load exerted on the conveyor.

The apparatus according to the invention and FIG. 9 has also the advantage that a bark collecting belt conveyor 56 is needed only under the barking drum since a slightly V-shaped middle beam 31 according to FIG. 7 conveys the loose bark to the drum. Consequently, the belt conveyor extension 57 is unnecessary, and significant savings are achieved.

This description of the invention has focused on the operation of the apparatus in the transport of pulp wood. The control rules of load equalising and packing forces according to the invention are also applicable to other materials cut into pieces, to bark or chips, for example, with some minor modifications.

The invention can also be applied to continuously operating conveyors wherein a larger part the transfer elements move forward whereas a smaller part moves backward at the same time, the speed of the return motion exceeding the speed of advance.

In a periodically operating apparatus, the transfer elements are preferably returned one by one but they can also be returned in groups, using at least two groups.

Here, the word "bend" has been used to express the difference between the angles of inclination of the parts of the transfer elements about the longitudinal axis.

What is claimed is:

1. A method of conveying a solid material in pieces comprising:

moving parallel, oblong transfer elements back and forth in a direction of transfer such that most of a surface of the transfer elements moves in the direction of transfer at least part of the surface of the transfer elements being inclined about a longitudinal axis of the surface toward a center of the conveyor;

carrying at least some material pieces on inclined outermost transfer elements on lower longitudinal parts of the outermost transfer elements, an angle of inclination of the lower longitudinal parts about the longitudinal axis being smaller than an angle of inclination of upper parts of the outermost transfer elements;

increasing a support force exerted by the outermost transfer elements on the pieces thereon, and increasing a friction force between the outermost transfer elements and the pieces; and decreasing a support force that second transfer elements disposed lower than the outermost transfer elements exert on the pieces, and decreasing a friction force between the second transfer elements and the pieces.

2. A method as defined in claim 1, wherein the transfer elements perform a return motion one by one.

3. A method as defined in claim 1, wherein waste contained in the material pieces is collected in a V-shaped portion formed by central ones of the transfer elements.

4. A conveyor for conveying a solid material in pieces comprising:

parallel, oblong transfer elements arranged to be moved back and forth in a direction of transfer such that most of a surface of the transfer elements in contact with the material is moved in the direction of transfer simultaneously, and at least part of the surface of the transfer elements being inclined about a longitudinal axis of the surface toward a center of the conveyor, wherein at least in some of the transfer elements an angle of inclination of a lower part of the transfer elements about the longitudinal axis is smaller than an angle of inclination of an upper part of the transfer elements.

5. An apparatus as defined in claim 4, wherein parts of the transfer elements having different angles of inclination are plane surfaces that form a concave angle between them.

6. An apparatus as defined in claim 4, wherein lowermost, central transfer elements define a V-shaped portion.

7. An apparatus as defined in claim 6, wherein outermost transfer elements are supported against the central elements by rollers.

8. An apparatus as defined in claim 4, wherein transfer elements disposed in a middle of the apparatus are inclined at different angles toward the center of the conveyor.

9. An apparatus as defined in claim 4, wherein a support frame carrying the support rollers is made from a plate.

10. An apparatus as defined in claim 4, wherein a vertical side part of the apparatus is made from an outermost transfer element which is mobile and side plates disposed between support legs of the apparatus are mobile.

* * * * *